US011461039B2

United States Patent
Kurosawa

(10) Patent No.: US 11,461,039 B2
(45) Date of Patent: Oct. 4, 2022

(54) NONVOLATILE MEMORY THAT STORES TEMPERATURE INFORMATION THEREIN

(71) Applicant: KIOXIA CORPORATION, Tokyo (JP)

(72) Inventor: Yasuhiko Kurosawa, Fujisawa Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 155 days.

(21) Appl. No.: 16/554,381

(22) Filed: Aug. 28, 2019

(65) Prior Publication Data

US 2020/0301602 A1 Sep. 24, 2020

(30) Foreign Application Priority Data

Mar. 19, 2019 (JP) .............................. JP2019-050995

(51) Int. Cl.
*G06F 3/06* (2006.01)
*G06K 19/07* (2006.01)

(52) U.S. Cl.
CPC .......... *G06F 3/0655* (2013.01); *G06F 3/0604* (2013.01); *G06F 3/0679* (2013.01); *G06K 19/0717* (2013.01)

(58) Field of Classification Search
CPC .... G06F 3/0655; G06F 3/0604; G06F 3/0679; G06K 19/717
See application file for complete search history.

(56) References Cited

U.S. PATENT DOCUMENTS

| 8,472,274 | B2 | 6/2013 | Fai et al. |
| 9,183,000 | B2 | 11/2015 | Ichida et al. |
| 9,640,281 | B1* | 5/2017 | Seo ...................... G06F 3/0604 |
| 2011/0205823 | A1* | 8/2011 | Hemink .................. G11C 16/26 365/211 |
| 2013/0110308 | A1* | 5/2013 | Pereira .................... G06F 1/206 700/300 |
| 2013/0148436 | A1* | 6/2013 | Kurosawa .............. G11C 16/26 365/185.24 |
| 2013/0227268 | A1* | 8/2013 | Ichida ..................... G06F 9/448 713/100 |
| 2014/0050026 | A1* | 2/2014 | Li ........................ G06F 12/0246 365/185.11 |
| 2017/0076810 | A1* | 3/2017 | Kurosawa .............. G11C 29/52 |
| 2017/0255403 | A1* | 9/2017 | Sharon ................ G11C 11/5642 |
| 2019/0043566 | A1* | 2/2019 | Wu ...................... G06F 11/1048 |
| 2019/0066736 | A1* | 2/2019 | Stichka ................. G11C 5/005 |
| 2019/0295665 | A1* | 9/2019 | Kojima .................. G11C 16/10 |

FOREIGN PATENT DOCUMENTS

JP H08-339693 A 12/1996
JP 2014509769 A 4/2014

* cited by examiner

*Primary Examiner* — Tracy C Chan
(74) *Attorney, Agent, or Firm* — Kim & Stewart LLP

(57) ABSTRACT

A nonvolatile memory includes a memory array, a sensor for measuring a temperature, an interface through which a write command is to be received, and a control circuit. The control circuit is configured to write information of the temperature measured by the sensor in a data storing area of the memory array in which user data associated with the write command is not capable of being written into, when writing the user data in the memory array in response to the received write command.

7 Claims, 8 Drawing Sheets

US 11,461,039 B2

NONVOLATILE MEMORY THAT STORES TEMPERATURE INFORMATION THEREIN

CROSS-REFERENCE TO RELATED APPLICATION

This application is based upon and claims the benefit of priority from Japanese Patent Application No. 2019-050995, filed Mar. 19, 2019, the entire contents of which are incorporated herein by reference.

FIELD

Embodiments described herein relate generally to a nonvolatile memory.

BACKGROUND

A nonvolatile memory such as a NAND flash memory has a performance characteristic which varies depending on an operating temperature. As such, it is desirable to properly record a temperature at a time when data is written in the nonvolatile memory.

DETAILED DESCRIPTION

Figure 1:
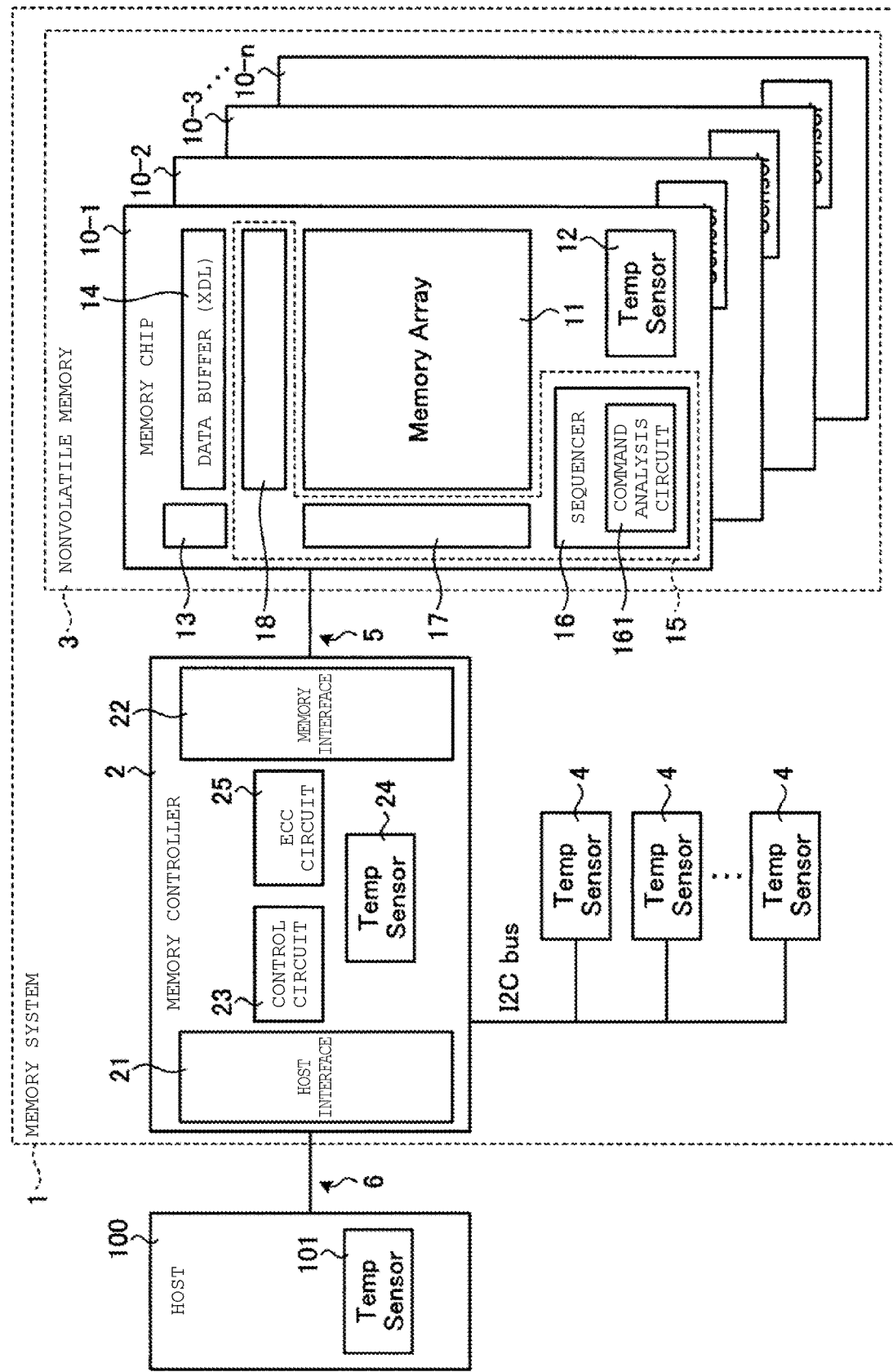
FIG. 1 is a diagram showing a configuration of a memory system including a nonvolatile memory according to an embodiment.

Embodiments provide a nonvolatile memory that records an operating temperature of the nonvolatile memory at a time when data is written into the non-volatile memory.

In general, according to one embodiment, a nonvolatile memory includes a memory array, a sensor for measuring a temperature, an interface through which a write command is to be received, and a control circuit. The control circuit is configured to write information of the temperature measured by the sensor in a data storing area of the memory array in which user data associated with the write command is not capable of being written into, when writing the user data in the memory array in response to the received write command.

A nonvolatile memory according to an embodiment will be described in detail below with reference to the attached drawings. It is noted that the present disclosure is not limited by the embodiments described below.

Embodiment

A nonvolatile memory according to an embodiment stores data in a nonvolatile manner but has a performance characteristic, e.g., data retention reliability, that depends on the operating temperature of the nonvolatile memory. For example, in the nonvolatile memory, a threshold voltage (Vth) fluctuates depending on the temperature at a time of a read operation and at a time of a write operation.

In such a nonvolatile memory, correction of the threshold voltage (Vth) may be performed based on a temperature measured by a built-in temperature sensor at the time of reading.

For example, when the nonvolatile memory is a three-dimensional NAND flash memory or the like, the temperature measured by the temperature sensor may be used to correct the threshold voltage, but there may be some fluctuations of the threshold voltage which cannot be corrected. When the temperature at the time of data writing and the temperature at the time of data reading are significantly different, the number of error bits in the read data may increase too much as a result of the shift in the threshold voltage so that the error bits cannot be corrected.

In addition, the temperature information at the time of writing is managed and recorded by an external controller. For example, in response to a temperature status acquisition command from the external controller, the nonvolatile memory measures a temperature and returns the temperature to the controller, and the temperature information of the measurement result may be written as metadata in a management information storing area in a memory array of the nonvolatile memory in response to a command from the controller. Subsequently, the nonvolatile memory writes the data to the memory array in response to a write command from the external controller. In this case, there is a time lag between the time when the temperature is measured and the time when the data is written, and even if correction is performed using the temperature measured at the time data is read from the memory array and the temperature information in the metadata, it may be difficult to accurately perform the correction where there is a significant temperature difference.

Further, the temperature is managed by the external controller per unit (e.g., per block) that is larger than a unit of data writing, and when viewed for each unit of data writing, there is a possibility that the temperature may significantly diverge from the temperature when data is written in the nonvolatile memory. From this point of view as well, even if the correction is performed using the temperature measured at the time of reading and the temperature information in the metadata, it tends to be difficult to accurately perform the correction where there is a significant temperature difference between these two values.

Therefore, in the present embodiment, when a control circuit writes data to the memory array in the nonvolatile memory, the control circuit writes information of a temperature measured by a built-in sensor in a storing area of the memory array where user data is not written, so that the temperature information at the time of writing may be properly recorded and managed.

Specifically, a memory system 1 may be configured as shown in FIG. 1. FIG. 1 is a diagram showing a configuration of the memory system 1. The memory system 1 is communicably connected to a host 100 and functions as an external storage device for the host 100. The memory system 1 may be a memory card or the like, or may be a solid state drive (SSD) or the like. The host 100 may be, for example, an information processing device such as a personal computer, a server, and a storage box, or a mobile terminal such as a mobile phone, an imaging device, and a tablet computer or a smartphone, or a game device, or an on-vehicle terminal such as a car navigation system. The host 100 may have a temperature sensor 101.

The memory system 1 has a memory controller 2, a nonvolatile memory 3, and a plurality of temperature sensors 4. The memory controller 2 has a host interface 21, a memory interface 22, a control circuit 23, a temperature sensor 24, and an Error Checking and Correcting (ECC) circuit 25.

The memory controller 2 is a semiconductor integrated circuit configured as, for example, a system-on-a-chip (SoC). Part or all of operation of each component of the memory controller 2 described below may be implemented by a central processing unit (CPU) executing firmware or may be implemented by hardware.

In the memory controller 2, the memory interface 22 is connected to the nonvolatile memory 3 by a memory bus 5, and the host interface 21 is connected to the host 100 by a host bus 6. The control circuit 23 controls a write operation to the nonvolatile memory 3 in accordance with a host write command received from the host 100 via the host interface 21. Further, the control circuit 23 controls a read operation from the nonvolatile memory 3 in accordance with a host read command received from the host 100 via the host interface 21. An industry standard with which the host bus 6 complies may be any standard, for example, serial advanced technology attachment (SATA), serial attached SCSI (SAS), Peripheral Component Interconnect express (PCIe)® (including NVM Express®), or the like.

The memory bus 5 communicates a signal in accordance with the memory interface 22. When the memory interface 22 is a so-called NAND interface, specific examples of the signal may include a chip enable signal CEn, a command latch enable signal CLE, an address latch enable signal ALE, a write enable signal WEn, a read enable signal REn, a ready and busy signal RBn, an input/output signal I/O, or the like. The signals, CEn, WEn, REn, and RBn, are separately provided for each memory chip of the nonvolatile memory 3. The "n" is a non-negative integer corresponding to any one of memory chips 1-n for which the signal is provided.

The signal CEn is a signal for enabling the nonvolatile memory 3. The signal CLE is a signal for notifying the nonvolatile memory 3 that the signal I/O being input to the nonvolatile memory 3 is a command. The signal ALE is a signal notifying the nonvolatile memory 3 that the signal I/O being input to the nonvolatile memory 3 is an address. The signal WEn is a signal for indicating that the signal I/O is an input signal I/O supplied to the nonvolatile memory 3. The signal REn is a signal for indicating that signal I/O is an output signal I/O from the nonvolatile memory 3. The ready and busy signal RBn is a signal indicating whether the nonvolatile memory 3 is in a ready state (a state in which nonvolatile memory 3 can receive a command from the memory controller 2) or in a busy state (a state in which the nonvolatile memory 3 cannot receive a command from the memory controller 2). The signal I/O is, for example, an 8-bit signal. The signal I/O includes data communicated between the nonvolatile memory 3 and the memory controller 2, and may be command, address, write data (data to be written), read data (data which is read), or the like.

The ECC circuit 25 encodes and decodes data for error detection and error correction in the read data. Specifically, the ECC circuit 25 encodes the data (write data) to be written to the nonvolatile memory 3. Further, the ECC circuit 25 decodes the data (read data) read from the nonvolatile memory 3. The ECC circuit 25 performs the error detection and the error correction on the read data by decoding. When the error correction fails, the ECC circuit 25 notifies the control circuit 23 of the error correction failure. Any algorithm using Reed-Solomon (RS) code, Bose-Chaudhuri-Hocquenghem (BCH) code, low-density parity-check (LDPC) code, or the like is applicable to an encoding and decoding algorithm by the ECC circuit.

For example, at the time of the write operation, under the control of the control circuit 23, the ECC circuit 25 receives user data to be written to the nonvolatile memory 3 by the write command, generates parity based on the user data, and adds the parity to the write data to set the addition result as the write date. The write data including the parity is written to the nonvolatile memory 20 as encoded data.

At the time of the read operation, under the control of the control circuit 23, the ECC circuit 25 receives the read data read from the nonvolatile memory 3 by the read command, extracts the parity from the read data, generates syndrome based on the parity, and determines presence or absence of an error bit in the user data. When the user data includes an error bit, the ECC circuit 25 specifies a position of the error bit. The number of error bits correctable in the ECC circuit 25 is determined by, for example, the number of bits of the parity. When the user data includes the error bit equal to or less than the number of the correctable error bits, the ECC circuit 25 corrects the error bit and notifies the control circuit 23 that the correction is successful. When the user data includes the error bit exceeding the number of the correctable error bits, the ECC circuit 25 notifies the control circuit 23 of the correction failure as being uncorrectable.

The nonvolatile memory 3 is a memory that stores data in a nonvolatile manner, and is, for example, a NAND flash memory (hereinafter also referred to as a NAND device). The following description provides an example where the NAND device is used as the nonvolatile memory 3, but it is also possible to use storage media other than the NAND device as the nonvolatile memory 3, such as a 3-dimensional structure flash memory, a resistive random access memory (ReRAM), a ferroelectric random access memory (FeRAM), or a magnetoresistive random access memory (MRAM). In addition, it is not essential that the nonvolatile memory 3 is a semiconductor memory, and the present embodiment is applicable to various storage media other than the semiconductor memory.

The nonvolatile memory 3 includes a plurality of memory chips 10-1 to 10-n (n is any integer more than or equal to 2). Each memory chip 10 has a memory array 11, a temperature sensor 12, an I/O interface 13, a data buffer (XDL) 14, and a control circuit 15. The control circuit 15 has a sequencer 16, a row module 17, and a column module 18. The sequencer 16 includes a command analysis circuit 161.

The row module 17 has a row decoder and a driver circuit, selects a block to be accessed using the row decoder, and further selects a row in the selected block. The driver circuit supplies a voltage to the selected block via the row decoder.

The column module 18 includes, for example, a sense amplifier and a data latch that is made up of a plurality of latch circuits. During the write operation, the column module 18 transfers the write data supplied from the memory controller 2 to the data latch via the I/O interface 13 and the data buffer 14, to the memory array 11. In addition, during the read operation, the column module 18 senses the data read from the memory array 11 and performs a necessary operation. Then, the column module 18 outputs the obtained read data to the memory controller 2 via the data latch, the data buffer 14, and the I/O interface 13.

The temperature sensor 12 is disposed in a vicinity of the memory array 11 in the memory chips 10, measures a temperature in the vicinity of the memory array 11, and generates a signal TEMP indicating the measured temperature.

The memory array 11 has a plurality of memory cells (a plurality of memory cell transistors MT). Each memory cell is associated with a row and a column. The memory array 11 stores data instructed by the write command from the memory controller 2.

Figure 2:
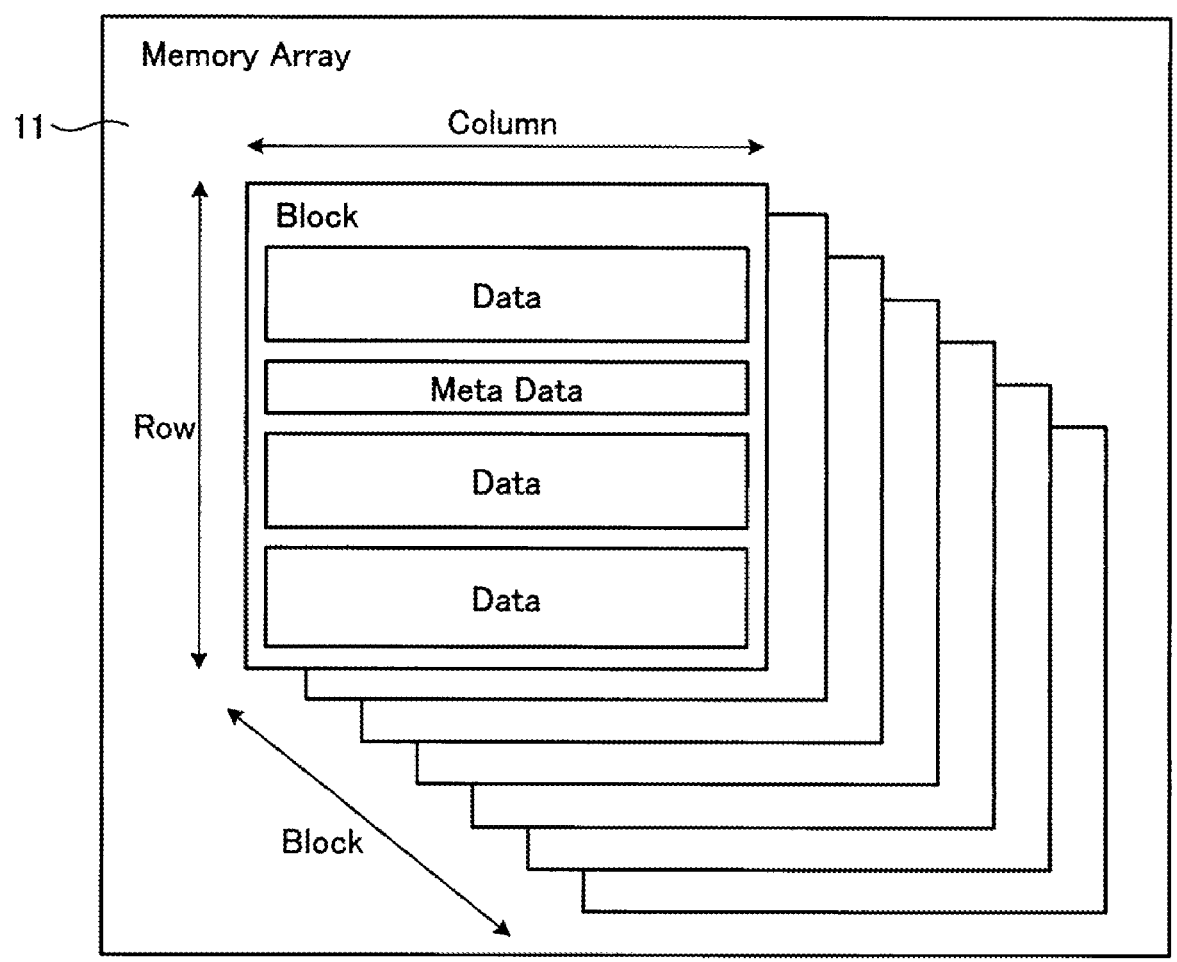
FIG. 2 is a diagram showing a configuration of data to be written to a memory array in the embodiment.

In the memory array 11 depicted in FIG. 2, writing and reading are performed in a data unit called a page, and erasing is performed in a data unit called a block. FIG. 2 is a diagram showing the configuration of data written to the memory array. In the present embodiment, a plurality of memory cells connected to a same word line is referred to as a memory cell group. In FIG. 2, data for each memory cell group in each block is shown as "data." Among these, data of a memory cell group allocated as a management information storing area is shown as metadata.

Figure 3:
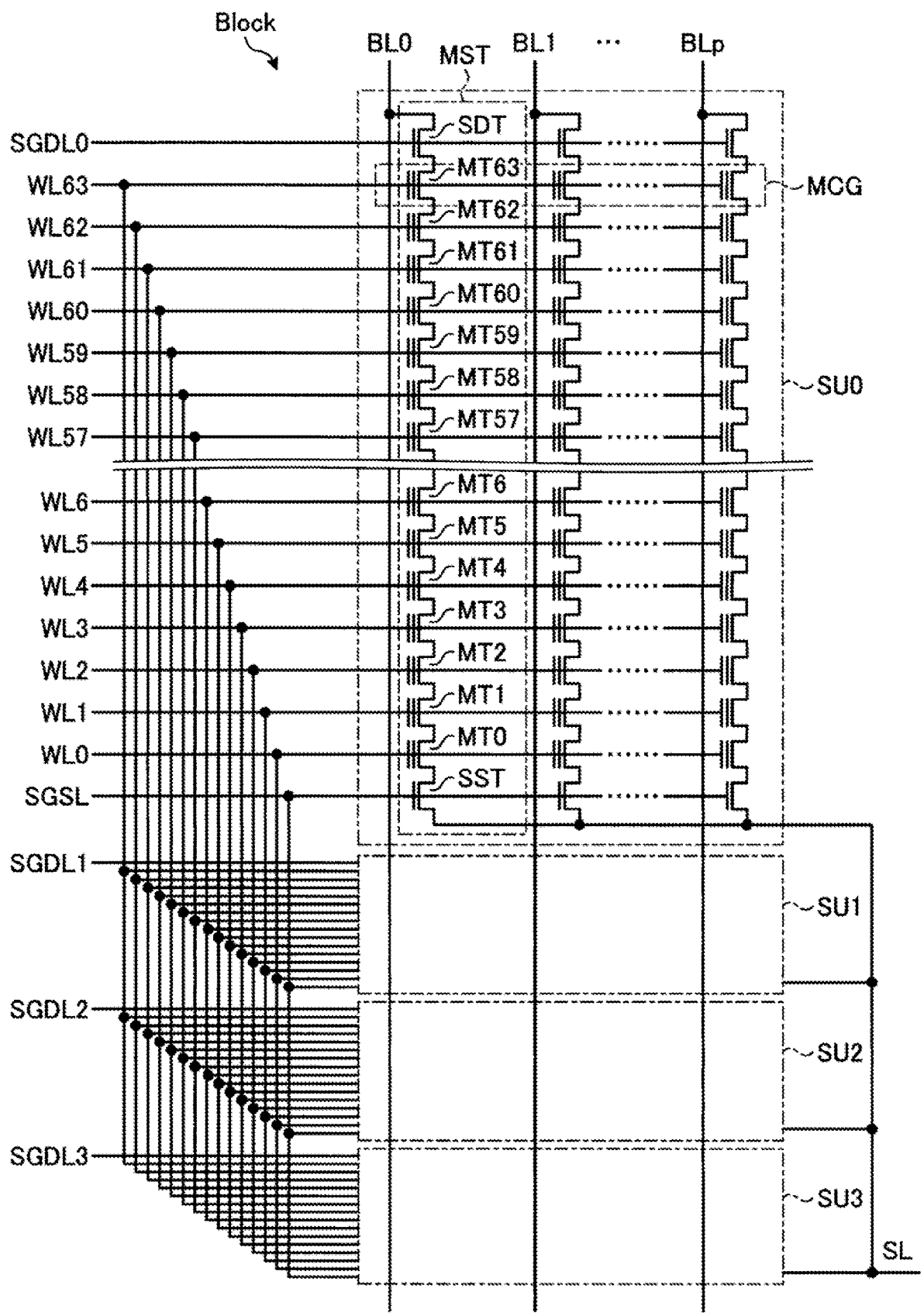
FIG. 3 is a circuit diagram showing a configuration of a block in the embodiment.

Each physical block is configured, for example, as shown in FIG. 3. FIG. 3 is a diagram showing a configuration of a physical block Block.

Each physical block Block has a plurality of string units SU0 to SU3. The plurality of the string units SU0 to SU3 correspond to a plurality of select gate lines SGDL0 to SGDL3 and share a select gate line SGSL. Each of the string units SU0 to SU3 functions as a unit of control in the physical block Block. Each string unit SU0 to SU3 may be selected by the corresponding select gate line among the plurality of the select gate lines SGDL0 to SGDL3 and the select gate line SGSL. In addition, each of the string units SU0 to SU3 includes a plurality of memory strings MST.

Each memory string MST includes, for example, 64 memory cell transistors MT (MT0 to MT63) and select transistors SDT and SST. The memory cell transistor MT has a control gate and a charge storage film and stores data in a nonvolatile manner. The 64 memory cell transistors MT (MT0 to MT63) are connected in series between a source of the select transistor SDT and a drain of the select transistor SST. Further, the number of the memory cell transistors MT in the memory string MST is not limited to 64.

Word lines WL0 to WL63 (referred to simply as WL where the word lines are not distinguished from one another) are commonly connected to the control gates of the memory cell transistors MT that are in the respective memory strings MST of each string unit SU in the physical block Block. That is, the control gate of the memory cell transistor MT in the same row of each string unit SU in the physical block Block is connected to the same word line WL. That is, the string unit SU of the physical block Block includes a plurality of memory cell groups MCG corresponding to a plurality of word lines WL, and each memory cell group MCG includes (p+1) memory cell transistors MT which are connected to the same word line WL. When each memory cell transistor MT is configured to be able to store a 1-bit value (when operating in a single-level cell (SLC) mode), the (p+1) memory cell transistors MT connected to the same word line WL (i.e., memory group MCG) are treated as one (1) physical page, and the write operation of data and the read operation of data are performed for each physical page.

Each memory cell transistor MT may be configured to be able to store a plurality of bit values. For example, when each memory cell transistor MT can store a value of n (n≥2) bits, storing capacity per word line WL is equal to a size of the n physical pages. That is, each memory cell group MCG is treated as the n physical pages. For example, in a multi-level cell (MLC) mode in which each memory cell transistor MT stores a 2-bit value, data corresponding to two (2) physical pages (upper page and lower page) is stored in each word line WL. Alternatively, in a triple-level cell (TLC) mode in which each memory cell transistor MT stores a 3-bit value, data corresponding to three (3) physical pages (upper page, middle page, and lower page) is stored in each word line WL. In the following, the triple-level cell (TLC) mode in which data corresponding to three (3) physical pages are stored in each word line WL will be mainly described.

First Embodiment

Figure 4:
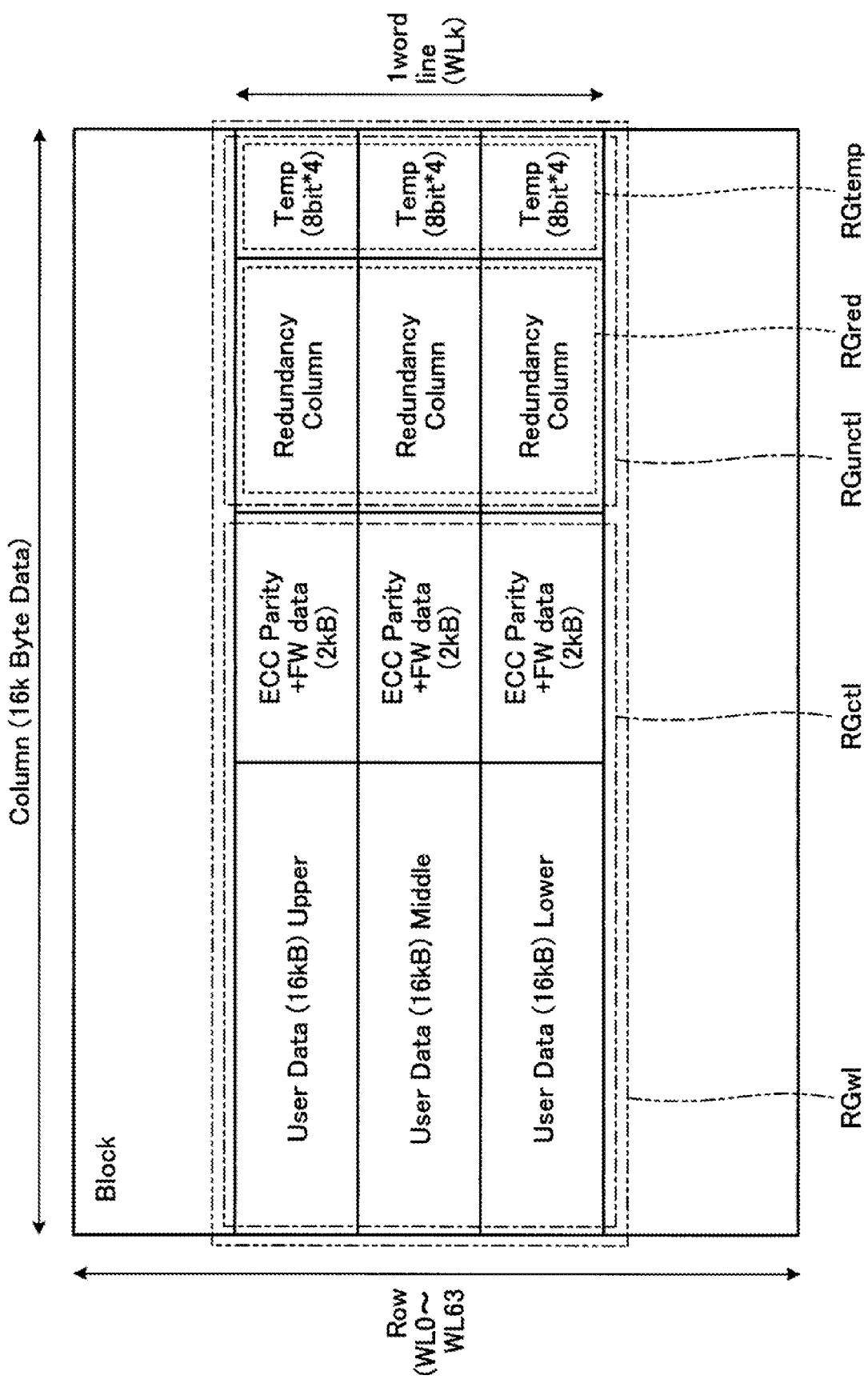
FIG. 4 is a diagram showing a configuration of a word line storage area in a first embodiment.

For example, as shown in FIG. 4, when the nonvolatile memory 3 performs a write operation, the nonvolatile memory 3 writes a value obtained by the built-in temperature sensor (for example, 8 bits: ±127° C. with 1 step as 1° C.) to a temperature storing area RGtemp provided for each word line storage area RGwl of the memory array 11. FIG. 4 shows a configuration of the word line storage area RGwl, and a case where a word line to be written is a word line WLk (k is any integer more than or equal to 0 and less than or equal to 63) is illustrated.

The word line storage area RGwl has an area RGctl accessible by the memory controller 2 and an area RGunctl not generally accessible by the memory controller 2.

The area RGctl is an area accessible by the memory controller 2 and includes a user data area (16 kB) and a parity area (2 kB) for each page (upper page, middle page, and lower page). User data specified by the write command is written to the user data area. An ECC parity for the user data and metadata used by firmware are written to the parity area.

The area RGunctl is an area that is generally inaccessible by the memory controller 2 and includes a redundant region RGred and the temperature storing area RGtemp. The redundant region RGred is an area to which memory cells are allocated for redundant writing (hereinafter referred to as "redundant memory cells"). The temperature storing area RGtemp is a dedicated area to which temperature information is to be written by the control circuit 15. As described above, the area RGunctl is an area that is generally inaccessible by the memory controller 2, but in the present embodiment, as described later, a dedicated command is provided and the temperature information written in the temperature storing area RGtemp becomes readable by the memory controller 2 using the dedicated command.

As an example of the temperature storing area RGtemp, a temperature may be stored for each page of the word line. For example, in the triple-level cell (TLC) mode, data corresponding to 3 physical pages (upper page, middle page, and lower page) is stored in each word line WL. FIG. 4 illustrates a case where the temperature storing area RGtemp is set as an area for storing a temperature for each page (upper page, middle page, and lower page) of the word line in the TLC mode.

For example, the word line storage area RGwl is expanded to be longer than normal to 4 bytes, and the expanded area is set as the temperature storing area RGtemp. When there are many errors at the time of reading, the control circuit 15 reads the temperature storing area RGtemp and performs a majority decision in a unit of bits or in a unit of the temperature storing area RGtemp (which is, e.g., bits). The control circuit 15 can estimate the temperature at the time of writing by determining the most frequent value (in a unit of bits or in a unit of the temperature storing area RGtemp) as a write temperature. Although a majority decision determination circuit may be implemented in the nonvolatile memory (NAND device) 3, here, an example will be described where the memory controller 2 reads a plurality of temperature areas and the majority decision is determined by the firmware of the memory controller 2.

For example, four (4) sets of temperatures in a range of ±127 are recorded in 8 bits in an increment of 1° C. Bit 0 represents the sign of + or −, and Bit 1 to Bit 7 represent an absolute value of a temperature. A bit pattern for each temperature may be as follows.

0b1111_1111: −127° C.
0b1111_1110: −126° C.
. . .
0b1000_0001: −1° C.
0b1000_0000: −0° C.
0b0000_0000: +0° C.
0b0000_0001: +1° C.
. . .
0b0111_1111: +127° C.

The nonvolatile memory 3 records four sets of temperatures read from the temperature sensor 12 inside the nonvolatile memory 3 at the time of writing in four 1-byte size areas of the temperature storing area RGtemp. Here, each of the four sets is separately written as a temperature recorded in area 1, a temperature recorded in area 2, a temperature recorded in area 3, and a temperature recorded in area 4.

In the example, the temperature recording area (temperature storing area RGtemp) is a physical area obtained by expanding the normal user data area and the ECC parity area on the memory array 11, but is logically placed in the area RGunctl which cannot be accessed by the normal read command or a program command. Therefore, a dedicated command for reading the temperature storing area RGtemp is defined. That is, the memory controller 2 can issue the following dedicated commands, and the command analysis circuit 161 (see FIG. 1) of the sequencer 16 can analyze the following dedicated commands.

For example, the memory controller 2 is able to read the temperature information written in the temperature storing area RGtemp according to the following sequence.

In a read sequence in related art which does not read the temperature information, the following (1-1) to (1-3) are sequentially performed.

(1-1) Data Read from the Memory Cell to the Data Buffer 14
  Page specification command
  00h command
  Address input (5 cycles)
  30h command
(1-2) Data Read from the Data Buffer 14
  05h command
  Address input (5 cycles)
  Data output (maximum 16 kB data+2 kB ECC parity)
  E0h command
Thereafter, (1-1) and (1-2) are executed by changing the address as necessary.
(1-3) Read Operation End
  3Fh command On the other hand, when using the dedicated commands for reading the temperature storing area RGtemp, the following (2-1) to (2-3) are sequentially performed as the read sequence for reading the temperature information.

(2-1) Data Read from the Memory Cell to the Data Buffer 14:
  Same as (1-1)
  Page specification command
  00h command
  Address input (5 cycles)
  30h command (2-2a) Data Read from the Data Buffer 14
  Same as (1-2)
  05h command
  Address input (5 cycles)
  Data output (up to 16 kB data+2 kB ECC parity)
  E0h command
(2-2b) the Temperature Information from the Data Buffer 14 is Read.
  0Fh command
  Address input (5 cycles)
  Temperature (4-byte temperature information)
  E0h command
Thereafter, (2-1) to (2-2a) and (2-2b) are executed by changing the address as necessary.
(2-3) Read Operation End
  Same as (1-3)
  3Fh command Here, in (2-1), four (4) sets of the temperature information are also transferred to the data buffer 14 together with the user data and the ECC parity. In the sequence of (2-2a), the user data and the ECC parity are read from the data buffer 14 similar to as how it is done in the related art. In (2-2b), the four (4) sets of the temperature information added according to the embodiments are read from the data buffer 14.

In an implementation in related art, when an address after the 16 kB user data+the 2 kB ECC parity is specified or data is output by sending REn (read enable signal) which is longer than 16 kB+2 kB, unspecified data, specifically, the last data of 16 kB+2 kB is repeatedly sent or fixed data such as all "0"s is output. In the present embodiment, unspecified data is also output similarly.

The memory controller 2 normally reads data from the nonvolatile memory 3 in the sequence described in (1-1) to (1-3). When the data read in the sequence cannot be corrected by the ECC, the memory controller 2 reads the data again in the sequence of (2-1) to (2-3). When the memory controller 2 reads the data in (1-2) and does not access another address, the memory controller 2 can obtain the temperature information by sending the commands of (2-2a) after (1-2). It may be also implemented such that if the memory controller 2 sends the commands of (1-3) and the commands of (1-1) for accessing the next address are not sent, the memory controller 2 obtains the temperature information by sending (2-2a).

When the temperature information obtained by executing (2-2b) is, for example, (0b0001_1100, 0b0001_1101, 0b0001_1100, and 0b0001_1100), that is, 28° C., 29° C., 28° C., and 28° C., the memory controller 2 estimates that the write temperature was 28° C. by a majority decision with 3 counts at 28° C. and 1 count at 29° C. In this case, the result is the same even if the memory controller 2 has a majority decision in a unit of bits and a majority decision on the entire 8 bits of the temperature information.

When the temperature information obtained by executing (2-2b) is, for example, (0b0001_1100, 0b0001_1101, 0b0001_1110, and 0b0001_1000), that is, 28° C., 29° C., 30° C., and 24° C., the temperature is not determined even if the memory controller 2 takes a majority decision because each temperature has 1 count. In this case, the memory controller 2 may make the temperature indeterminate, or estimate the temperature information by determining any value, for example, 28° C. at the head of the obtained temperatures, or estimate the temperature by choosing the bigger value among the temperatures which are close to the median of all temperatures such that when the temperatures are arranged from the lower temperature to the higher temperature, i.e., 24° C., 28° C., 29° C., and 30° C., 29° C. which is the second value from the last may be chosen. Alternatively, the memory controller 2 may estimate the four (4) pieces of temperature information as follows by taking a majority decision 1 bit at a time.

Take a majority decision of the 1st bit (0, 0, 0, 0) "0"
Take a majority decision of the 2nd bit (0, 0, 0, 0) "0"
Take a majority decision of the 3rd bit (0, 0, 0, 0) "0"
Take a majority decision of the 4th bit (1, 1, 1, 1) "1"
Take a majority decision of the 5th bit (1, 1, 1, 1) "1"
Take a majority decision of the 6th bit (1, 1, 1, 0) "1"
Take a majority decision of the 7th bit (0, 0, 1, 0) "0"
Take a majority decision of the 8th bit (0, 1, 0, 0) "0"

Therefore, when taking a majority decision 1 bit at a time, the memory controller 2 estimates that it is +28° C. with 0b0001_1100 overall. When there is the same number of bits for each bit, the memory controllers 2 may estimate that the value is set to a predetermined value, for example, "1".

When the estimated temperature cannot be determined by the majority decision based on the whole or the bits, the memory controller 2 may estimate the temperature information from another page of the same word line (the middle page or the upper page when reading the lower page) or an adjacent word line (the word line WL2 or the word line WL4 when the word line WL3 is read).

The nonvolatile memory 3 may write a value (for example, +25° C.=0x0019) read from the temperature sensor as is to 4 redundant columns 4 times for the write temperature, or may write the value as four 1-byte pseudo random numbers calculated by XORing the value with a pseudo random number (generated by another known method such as a built-in scrambler or inputted as data from the outside (controller)). When the built-in scrambler is used, the nonvolatile memory 3 may descramble data internally and output the data or may read the scrambled data and descramble the data on the controller side. When the data for scrambling is input from the memory controller 2 to the nonvolatile memory 3, the memory controller 2 reads the scrambled data, and the memory controller 2 descrambles the scrambled data. In a case of descrambling with the memory controller 2, the descrambling is performed and then a majority decision is taken. When the temperature information is recorded in a same column of 3 TLC pages, there is a high probability that a temperature code will be almost the same, so the values recorded in the same column of the 3 pages (lower page, middle page, and upper page) tend to be a combination of (0, 0, 0) or (1, 1, 1).

Therefore, although not particularly described in each embodiment, it may be implemented such that the pseudo random number inputted from the outside or the pseudo random number generated by the built-in scrambler, and the temperature information are XORed and recorded to reduce a probability of the combination of (0, 0, 0) or (1, 1, 1). Further, in the embodiment, although 8 bits of the temperature information at the time of writing are recorded as they are, it may be implemented such that the temperature information may be offset by +64 or the like and recorded.

As described above, in the present embodiment, when the control circuit 15 writes data to the memory array 11 in the nonvolatile memory 3, the control circuit 15 writes the temperature information measured by the built-in temperature sensor 12 to the storing area to which user data is not to be written in the memory array 11. As a result, the temperature at the time of writing can be properly recorded and managed. Therefore, the memory controller 2 can know an appropriate temperature at the time of writing, and so the ways, methods and options the memory controller can cope with a sensed read temperature that differ significantly from a sensed write temperature, are increased.

First Modification Example of First Embodiment

In (2-2b) of the embodiment, the memory controller 2 reads the 4 sets of the temperature information added according to embodiments, from the data buffer 14. In operation, it may be implemented such that since only the column where the temperature information is recorded is outputted, instead of implementing a new command called the 0Fh command, a column address that can be specified by the 05h command can be specified outside the 16 kB user data area and the 2 kB ECC parity area, so that the temperature information is outputted at 18 kB to 18 kB+4B.

In an implementation of the related art, when an address after the 16 kB user data+the 2 kB ECC parity is specified or data is output by sending the REn (read enable signal) which is longer than 16 kB+2 kB, the unspecified data, specifically, the last data of 16 kB+2 kB is repeatedly sent or fixed data such as all "0"s is output. In the embodiments, the unspecified data is similarly output, but in the present modification example, since the temperature information area is disposed after 18 kB of the data+ECC parity, 4 bytes of the temperature information may be output instead of the unspecified data.

Second Modification Example of First Embodiment

Figure 5:
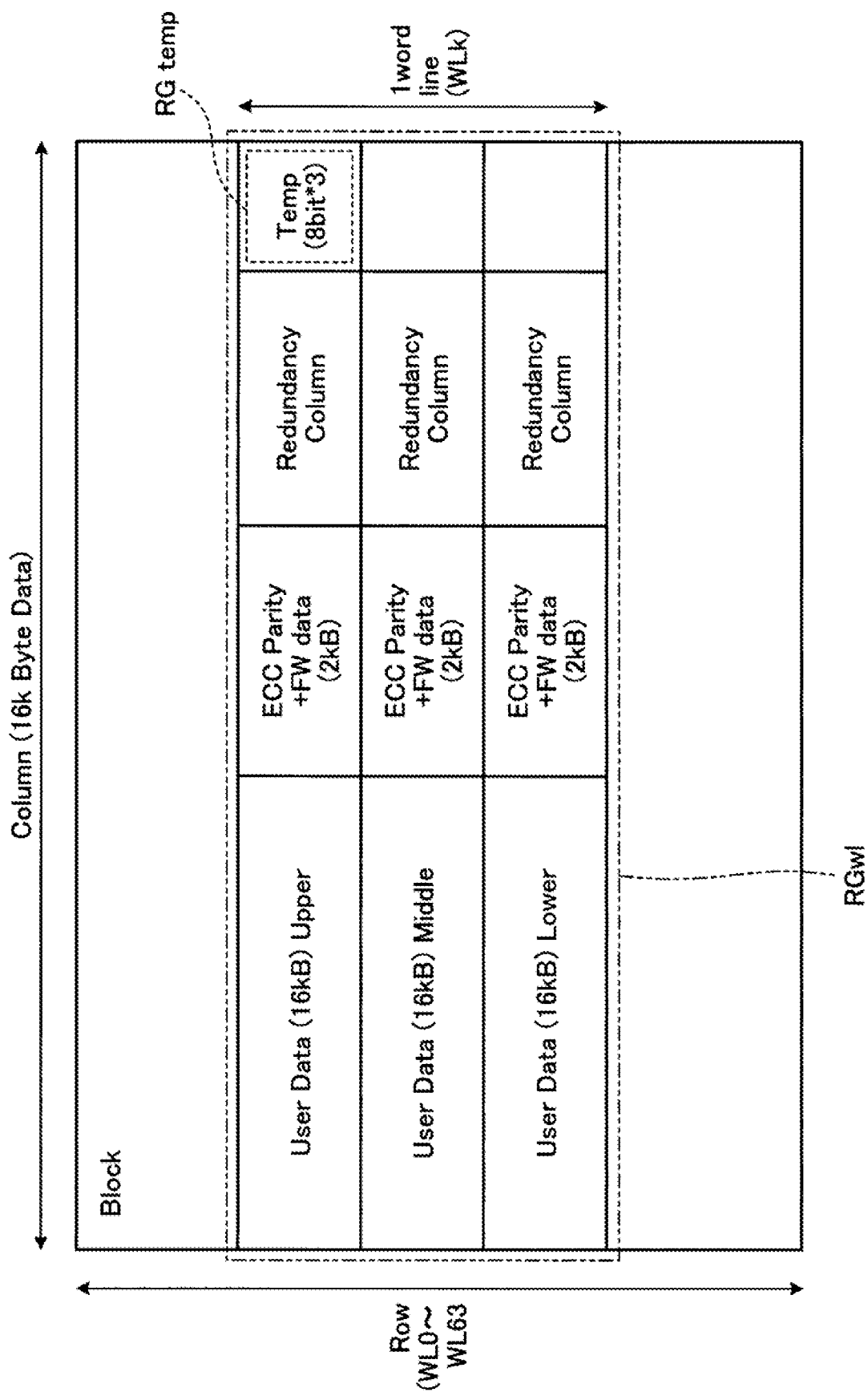
FIG. 5 is a diagram showing a configuration of a word line storage area in a modification example of the first embodiment.

As shown in FIG. 5, as an example of the temperature storing area RGtemp in the word line storage area RGwl, the temperature may be stored in the SLC mode for each word line. FIG. 5 is a diagram showing a configuration of the word line storage area RGwl in the second modification example of the embodiment. In this case, reliability of the temperature information written to the temperature storing area RGtemp can be improved.

Second Embodiment

Figure 6:
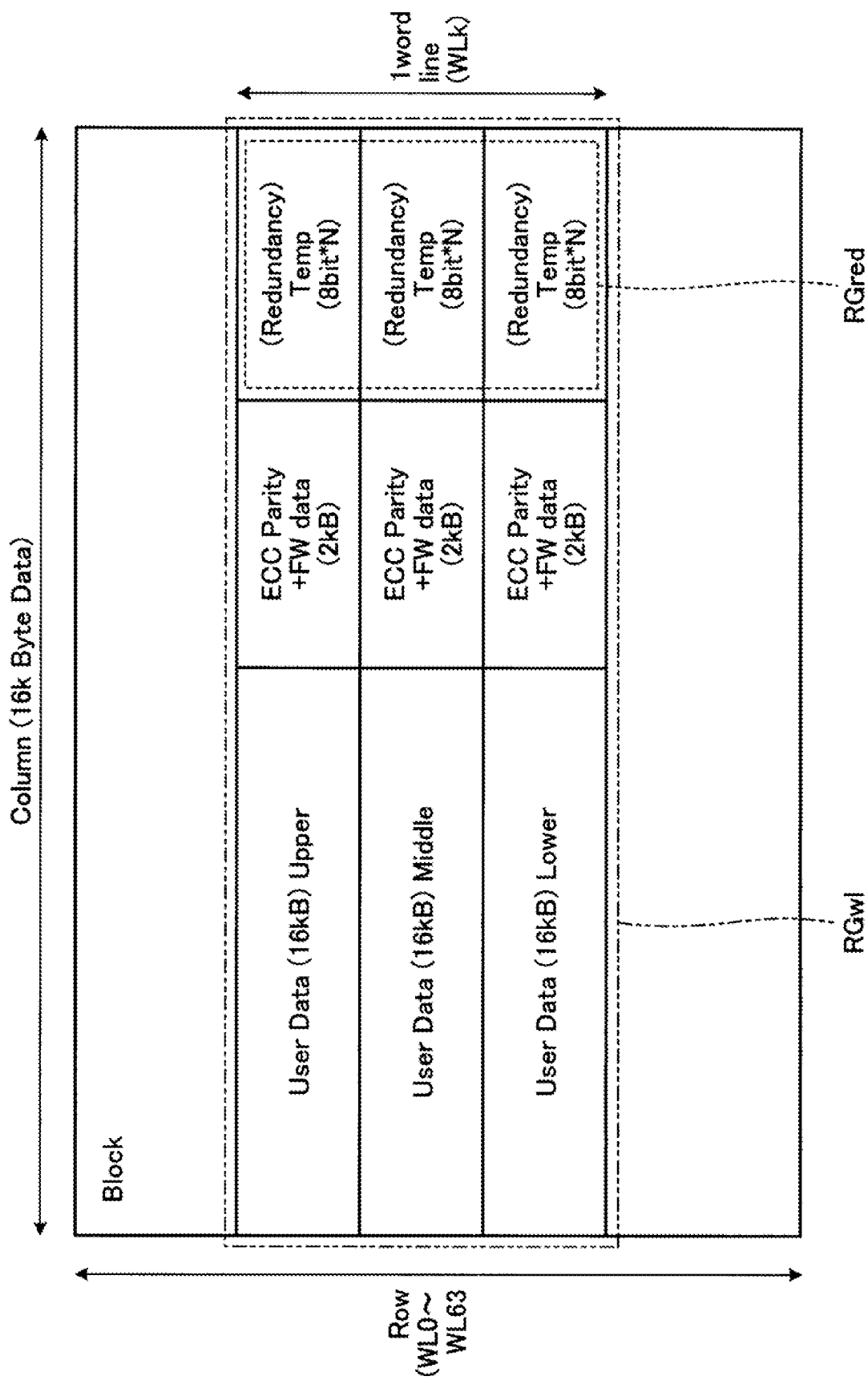
FIG. 6 is a diagram showing a configuration of a word line storage area in a second embodiment.

As shown in FIG. 6, when nonvolatile memory 3 performs a write operation, the nonvolatile memory 3 may write the value of the built-in temperature sensor (for example, 8 bits: ±127° C. with 1 step as 1° C.) as metadata in several redundant column sets (in this example, 32 sets×2/set=sets), which is in the redundant region RGred (for example, 32 sets in 2-byte units) for defective column recovery of NAND. FIG. 6 is a diagram showing a configuration of the word line storage area RGwl in the second embodiment.

When there are many errors at the time of reading, the memory controller 2 reads the redundant column and performs a majority decision by a unit of bits or a unit of columns (8 bit). The memory controller 2 can estimate a temperature at the time of writing for each word line (or for each page in the word line in the TLC) by determining the most frequent value (by a unit of bits or a unit of columns) as the write temperature.

The control circuit 15 may write a value (for example, +25° C.=0x0019) read from the temperature sensor 12 as is to 64 redundant columns 64 times for the write temperature, or may write the value as 64 1-byte pseudo random numbers calculated by XORing the value with a pseudo random number (generated by another known method such as a built-in scrambler or inputted as data from the outside (memory controller 2)).

In an implementation of the related art, when an address after the 16 kB user data+the 2 kB ECC parity is specified or data is output by sending the REn (read enable signal) which is longer than 16 kB+2 kB, the unspecified data, specifically, the last data of 16 kB+2 kB is repeatedly sent or fixed data such as all "0"s is output. Similarly in the modification example, as in the first embodiment, the 0Fh command (which is the same as the first embodiment) may be defined as a temperature information read dedicated command. A specific sequence may be the same as (2-1) to (2-5) of the first embodiment. Although the sequence is the same, in the first embodiment, the area where the temperature information is written is the column area expanded to be dedicated to the temperature, whereas in the second embodiment, there is a difference in that the redundant column in the related art is now assigned as the temperature recording area.

Instead of adding the area dedicated to the temperature information as in the first embodiment, the redundant column in the related art for the defective column recovery is used in the present embodiment, so although all the expanded columns may be used to replace the defective columns because there are many defective columns, a possibility that the temperature information cannot be obtained is low for the following reasons and thus a possibility of lessened reliability is minimized.

(Reason 1): It is unlikely that almost all redundant columns will be used to replace the defective columns.

(Reason 2): The temperature information at the time of writing is required only when error cannot be corrected by normal method and retry reading is performed.

In an implementation in related art, when an address after the 16 kB user data+the 2 kB ECC parity is specified or data is output by sending the REn (read enable signal) which is longer than 16 kB+2 kB, the unspecified data, specifically, the last data of 16 kB+2 kB, is repeatedly sent or fixed data such as all "0"s is output. In the embodiment, the unspecified data is similarly output, but as the second modification example, since the temperature information area is disposed after 18 kB of the data+ECC parity, 4 bytes of the temperature information may be output instead of the unspecified data.

Third Embodiment

Figure 7:
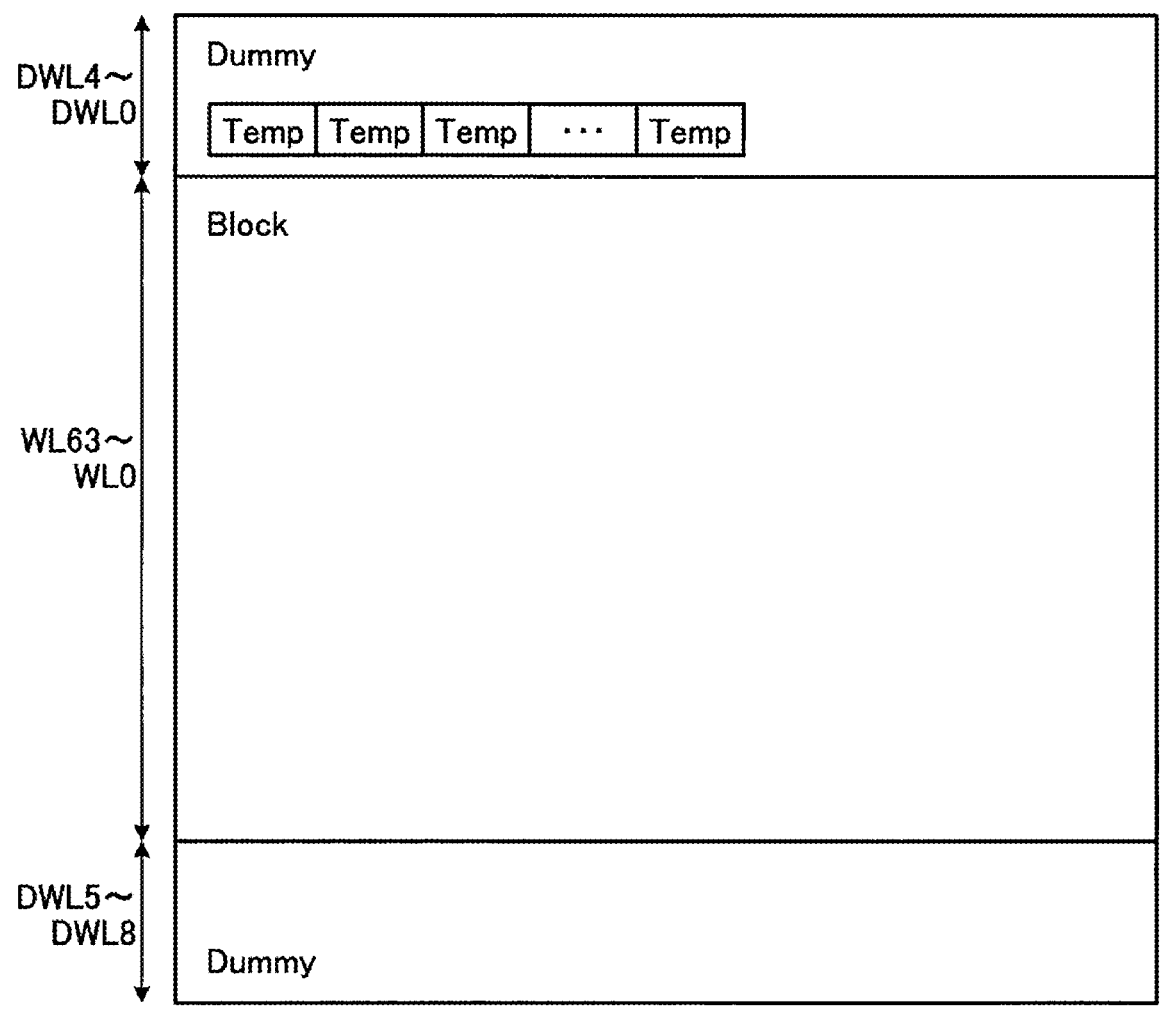
FIG. 7 is a diagram showing a configuration of a dummy word line storage area in a third embodiment.

As shown in FIG. 7, when the nonvolatile memory 3 performs a write operation, the nonvolatile memory 3 may write a value of the built-in temperature sensor 12 (for example, 8 bits: ±127° C. with 1 step as 1° C.) to a determined area of a dummy word line DWL in the memory array 11. As an example of the determined area, 64 sets may be set in the first 64 bytes of the dummy word line DWL and written as metadata.

When there are many errors at the time of reading, the memory controller 2 reads the dummy word line DWL and performs a majority decision by a unit of bits or a unit of columns (8 bit). The memory controller 2 can estimate the temperature at the time of block writing by determining the most frequent value (by a unit of bits or a unit of columns) as the write temperature. (the scrambler may be used as in the embodiment.)

The memory controller 2 may designate an address of the dummy word line DWL as an address of a normal read command for reading of the dummy word line DWL and may use a new command, for example, the 0Fh command of (2-2a) of the first embodiment as a command for reading of the dummy word line DWL as shown below.

The memory controller 2 sequentially performs the following (2-2) to (2-4) as a read sequence for reading temperature information.

(2-2) Data Read from the Memory Cell to the Data Buffer 14:
    Same as (1-1)
    Page specification command
    00h command
    Address input (5 cycles)
    30h command
(2-2a) Data Read from the Data Buffer 14
    Same as (1-2)
    05h command
    Address input (5 cycles)
    Data output (maximum 16 kB data+2 kB ECC parity)
    E0h command
Thereafter, (1-1) and (1-2) are executed by changing the address as necessary.
(2-2b) Reading of the Temperature Information from the Data Buffer 14
    0Fh command
    Specifying the dummy WL by address input (5 cycles)
    Temperature (4B temperature information)
    E0h command
Thereafter, (2-1) to (2-2a) and (2-2b) are executed by changing the address as necessary.
(2-4) Read Operation End
    Same as (1-3)
    3Fh command Fourth Embodiment When the nonvolatile memory 3 performs a write operation, the nonvolatile memory 3 may set a value of the built-in temperature sensor (for example, 8 bits: ±127° C. with 1 step as 1° C.) as a part of the data or a default value which should be written to each word line storage area in the memory array 11. For example, when the nonvolatile memory 3 receives a write command, the nonvolatile memory 3 initializes a storing area (for example, a storing area for 1 page) in the data buffer 14 (see FIG. 1) with a default value before storing the write data in the data buffer 14. Normally, a predetermined bit pattern (for example, all "1"s) is used as the default value, but in the present embodiment, the temperature information is used as the default value instead of the predetermined bit pattern, and the storing area on the data buffer 14 is initialized with the temperature information as the default value. As a result, if there is a part of the storing area which is not overwritten by the write data, the temperature information is continuously stored in the partial storing area. Hereinafter, in the present embodiment, the temperature information of 1 byte is repeated 32 times in a part of the word line storage area, for example, the last 32 bytes of each word line storage area.

In the present embodiment, since the temperature information is used as the default value of 18 kB of the normal user data+the ECC parity area of the memory array 11, the memory controller 2 can use the normal read command for reading from the memory array 11. When writing, the memory controller 2 may use a write command as is or may use a new command which uses the temperature information as the default value. In the following embodiment, a case where a new command (83h command) is defined is described. In the following description, although an example in which the temperature information is set as the default value is described, it may be implemented such that the pseudo random number inputted from the outside or the pseudo random number generated by the built-in scrambler, and the temperature information are XORed and recorded to reduce the probability of the combination of (0, 0, 0) or (1, 1, 1).

The memory controller 2, for example, reads temperature information in the following sequence.

For example, the memory controller 2 sequentially performs the following (1-1) to (1-4) as a program sequence in the related art, which does not use temperature information as a default value.

(1-1) Address specification, data input
   01h command (TLC lower page specification command)
   80h command (program command)
   Address input (5 cycles)
   Data input (16 kB data+2 kB ECC parity)
   1Ah command (switch of data buffer)

(1-2)
   02h command (TLC middle page specification command)
   80h command (program command)
   Address input (5 cycles)
   Data input (16 kB data+2 kB ECC parity)
   1Ah command (switch of data buffer)

(1-3)
   03h command (TLC upper page specification command)

(1-4)
   80h command (program command)
   Address input (5 cycles)
   Data input (16 kB data+2 kB ECC parity)
   10h command (program execution)

In the above sequence, the memory controller 2 initializes the data buffer for the program with all "1"s by using the 80h command, and then inputs the data to be written.

If the size of the write data is smaller than each of the lower, middle, and upper page, an area not inputted with data is written with all "1"s.

For example, as a new program sequence for initializing a storing area (for example, a storing area for 1 page) on the data buffer 14 (see FIG. 1) with temperature information, the memory controller 2 performs the following (2-1) to (2-4) sequentially.

(2-1) Address Specification, Data Input
   01h command (TLC lower page specification command)
   83h command (program command to initialize the last 32 bytes of the data buffer with 32 repetitions of 1 byte of the temperature information and the rest of the data buffer with all "1"s)
   Address input (5 cycles)
   Data input (16 kB data+2 kB ECC parity)
   1Ah command (switch of data buffer)

(2-2)
   02h command (TLC middle page specification command)
   83h command (program command to initialize the last 32 bytes of the data buffer with 32 repetitions of 1 byte of the temperature information and the rest of the data buffer with all "1"s)
   Address input (5 cycles)
   Data input (16 kB data+2 kB ECC parity)
   1Ah command (switch of data buffer)

(2-3)
   03h command (TLC upper page specification command)
   83h command (program command to initialize the last 32 bytes of the data buffer with 32 repetitions of 1 byte of the temperature information and the rest of the data buffer with all "1"s)
   Address input (5 cycles)
   Data input (16 kB data+2 kB ECC parity)
   10h command (program execution)

In the above sequence, the memory controller 2 initializes the last 32 bytes of the data buffer for the program by repeating the temperature information of 1 byte 32 times and initializes the rest of the area of the data buffer with all "1"s, by using the newly defined 83h command, and inputs the data to be written.

If a size of the write data is smaller than each of the lower, middle, and upper page, the area where data is not input is all "1"s except for the last 32 bytes, and the temperature information is written to the area where data is not input in the last 32 bytes.

Figure 8:
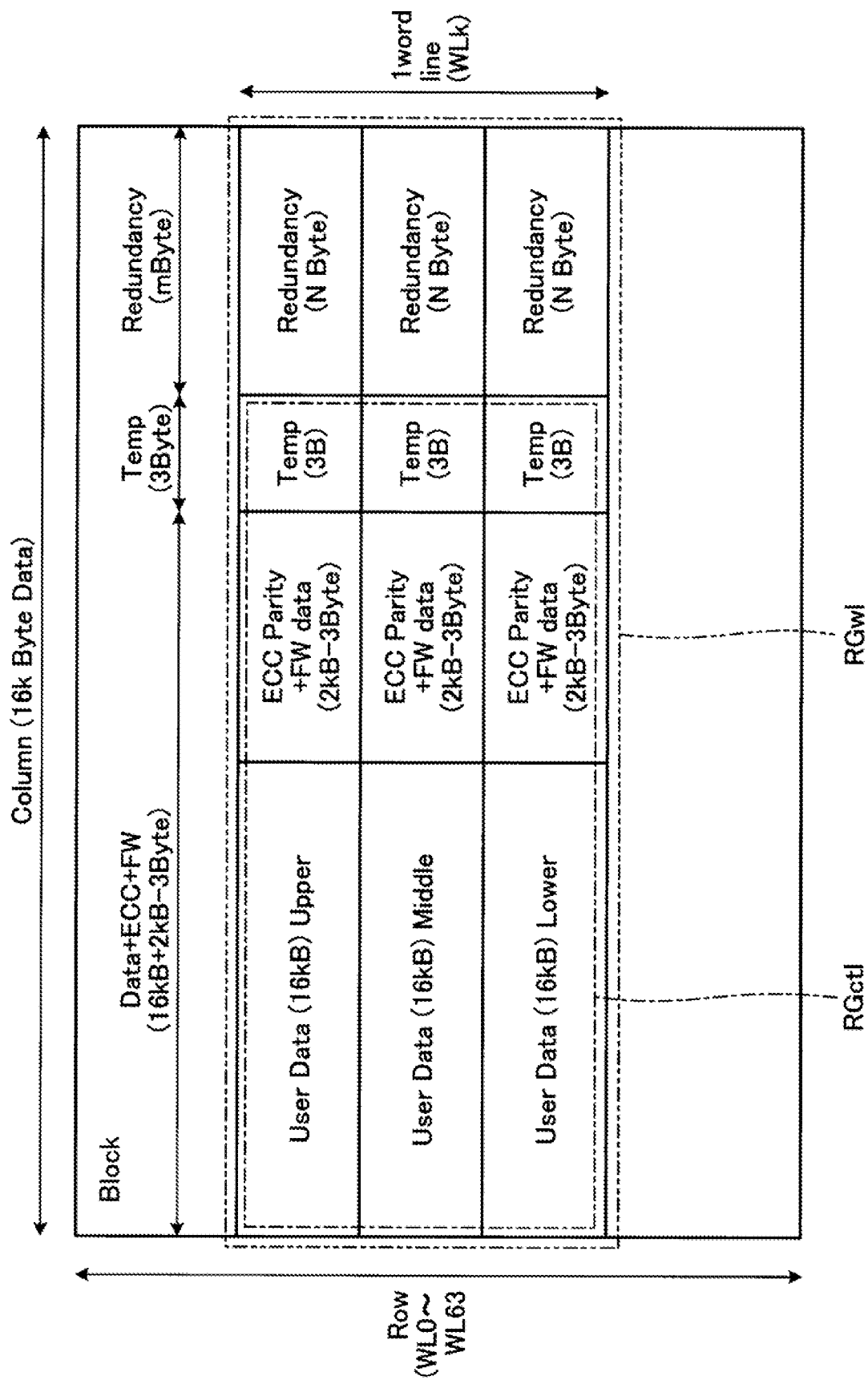
FIG. 8 is a diagram showing a configuration of a word line storage area in a fourth embodiment.

That is, if the write data size is restricted to be smaller than the 16 kB user data+the 2 kB ECC parity, as shown in FIG. 8, all or part of the 32-byte temperature information is written as data to the memory array 11 without being overwritten, so that by reading the last 32 bytes of each word line WL with the read command in related art, it is possible to read the temperature information at the time of writing.

FIG. 8 is a diagram showing a configuration of a word line storage area RGwl in the fourth embodiment.

Fifth Embodiment

In the word line storage area RGwl, the temperature storing area RGtemp may be protected by an ECC such as SECDED (1 bit error correction, 2 bit error detection) instead of providing a plurality (4 bytes) of the temperature storing areas RGtemp. For example, the sequencer 16 (see FIG. 1) may perform the ECC such as SECDED on the temperature information of the temperature storing area RGtemp, and additionally write the ECC parity to the temperature storing area RGtemp. Further, the sequencer 16 may perform error correction of the temperature information using the ECC parity when reading the temperature information from the temperature storing area RGtemp. As a result, it is possible to estimate the temperature at the time of writing by error correction instead of a majority decision. Further, when the error correction is not possible, and an error is detected, the temperature may be that "write temperature is invalid".

Sixth Embodiment

Further, in the word line storage area RGwl, a temperature range instead of a temperature value itself may be divided into a plurality of temperatures, and information about which temperature range the temperature value belongs to may be recorded at the time of writing.

For example, 1-bit information is recorded such as "1" when writing at +85° C. or higher, and "0" otherwise. The nonvolatile memory 3 records the 1-bit information, for example, 16 times in a 2-byte area. The sequencer 16 (see FIG. 1) may read the information recorded 16 times and take a majority decision about the information to estimate information of the temperature.

First Modification Example of Sixth Embodiment

In another example, the nonvolatile memory 3 divides a temperature range into 4 regions such as less than −10° C., more than or equal to −10° C. and less than +85° C., more than or equal to +85° C. and less than +125° C., and more than or equal to +125° C., and records 4 states of 2 bits with each region corresponding to "00", "01", "10", and "11", respectively. The nonvolatile memory 3 records the 2-bit information 8 times in a 2-byte area. The sequencer 16 (see FIG. 1) may read the information recorded 8 times and take a majority decision about the information to estimate information of the temperature.

Seventh Embodiment

The nonvolatile memory 3 reads, at the time of reading, temperature information and a temperature area stored in such a manner that a temperature range is divided and recorded in a plurality in the first embodiment or the above sixth embodiment, etc., performs ECC correction and takes a majority decision, and uses the information together with the temperature information at the time of reading of the memory array 11 to adjust reading Vth, reading speed, or the like. As a result, it is possible to reduce the number of error bits of the read data of the memory array 11 when the write temperature is extremely high or extremely low, or a difference between the write temperature and the read temperature is large.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonvolatile memory comprising:
   a memory array having a plurality of memory cells including a first set and a second set, wherein the memory cells of the first set and the memory cells of the second set are connected to a common word line;
   a sensor for measuring a temperature;
   an interface through which a write command is to be received; and
   a control circuit configured to write user data, parity data, and temperature information in response to the write command, wherein
   in response to a write command designating the common word line, the control circuit writes the user data and the parity data in the first set of the plurality of memory cells connected to the common word line and the temperature information in the second set of the plurality of memory cells connected to the common word line, the temperature information being acquired from the sensor and corresponding to the temperature measured by the sensor when the control circuit is writing the user data and the parity data, and
   the user data and the parity data are written in the first set of the plurality of memory cells according to a first writing mode and the temperature information is written in the second set of the plurality of memory cells according to a second writing mode, wherein the first writing mode and the second writing mode are different.

2. The nonvolatile memory according to claim 1, wherein the temperature information is stored in a dedicated area in the memory array that includes the second set of the plurality of memory cells.

3. The nonvolatile memory according to claim 2, wherein upon receiving a command including designation of the dedicated area through the interface, the control circuit reads the temperature information written in the dedicated area in response to the command, and outputs the temperature information via the interface.

4. The nonvolatile memory according to claim 1, wherein the temperature information is stored in a redundant region in the memory array that includes the second set of the plurality of memory cells.

5. The nonvolatile memory according to claim 4, wherein upon receiving a command including designation of the redundant region through the interface, the control circuit reads the temperature information written in the redundant region in response to the command, and outputs the temperature information via the interface.

6. The nonvolatile memory according to claim 1, wherein the first writing mode is a writing mode by which more than one bit are written per memory cell and the second writing mode is a writing mode by which only one bit is written per memory cell.

7. The nonvolatile memory according to claim 1, wherein the memory array includes a plurality of blocks and one of the blocks includes the memory cells of the first set and the memory cells of the second set.

* * * * *